(12) United States Patent  
Ferenc (10) Patent No.: US 6,956,193 B2  
(45) Date of Patent: Oct. 18, 2005

(54) HIGHLY SENSITIVE IMAGING CAMERA FOR SPACE APPLICATIONS INCLUDING DETECTION OF ULTRAHIGH ENERGY COSMIC RAYS

(75) Inventor: Daniel Ferenc, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 304 days.

(21) Appl. No.: 10/457,044

(22) Filed: Jun. 6, 2003

(65) Prior Publication Data

US 2004/0051046 A1 Mar. 18, 2004

Related U.S. Application Data

(60) Provisional application No. 60/386,984, filed on Jun. 6, 2002.

(51) Int. Cl.[7] .................................................. H01J 40/14
(52) U.S. Cl. ................................ 250/207; 250/214 VT; 359/743
(58) Field of Search .......................... 250/207, 214 VT; 313/542, 544, 523; 359/742, 743

(56) References Cited

U.S. PATENT DOCUMENTS

| | | | |
|---|---|---|---|
| 3,238,406 A | | 3/1966 | Greilich et al. |
| 3,771,004 A | | 11/1973 | Plumeau |
| 5,864,207 A | * | 1/1999 | Kume et al. ................. 313/533 |
| 6,674,063 B2 | | 1/2004 | Ferenc |
| 2001/0017344 A1 | * | 8/2001 | Aebi ..................... 250/214 VT |

FOREIGN PATENT DOCUMENTS

| | | |
|---|---|---|
| DE | 861 296 | 12/1952 |
| DE | 1106436 | 5/1961 |

OTHER PUBLICATIONS

Ferenc, "Imaging hybrid photon detectors with minimized dead area and protection against positive ion feedback", Nuclear Instruments and Methods in Physics Research A 431 (1999) 460–475.

Ferenc, "Imaging Hybrid Photon Detectors with a Reflective Photocathode", Nuclear Instruments in Physics Research A 442 (2000) 150–153.

Grigor'Ev et al., "A Cerenkov Counter for Charged–Kaon and Pion Identification in the Momentum Range of 600–700 MeV/c", Instrument and Experimental Techniques, vol. 41, No. 6, 1998, pp. 803–809.

Ferenc, "Solution to the ion feedback problem in hybrid photon detectors and photomultiplier tubes", Nuclear Instruments and Methods in Physics Research A 427 (1999) 518–523.

(Continued)

*Primary Examiner*—David Porta  
*Assistant Examiner*—Davienne Monbleau  
(74) *Attorney, Agent, or Firm*—John P. O'Banion (57) ABSTRACT

An imaging camera includes a housing that defines a proximal end and a distal end. A Fresnel lens is installed in the proximal end of the housing. Moreover, a reflection mode photocathode is installed in the distal end of the housing opposite the Fresnel lens. An electron sensor is disposed in the center of the Fresnel lens. A conductive layer is disposed on the interior of the housing. Further, the Fresnel lens establishes plural concentric optically passive surfaces that are parallel to a central axis defined by the imaging camera. A conductive layer is disposed on each optically passive surface, and an electron lens is established by the conductive layer on the interior of the housing and the conductive layers on the Fresnel lens.

20 Claims, 6 Drawing Sheets

OTHER PUBLICATIONS

Radu et al., "Design studies for nonimaging light concentrators to be used in very high-energy gamma-ray astronomy", Nuclear Instruments and Methods in Physics Research A 446 (2000) 497–505.

Ferenc, "New Developments in Hybrid Photon Detectors", Proceedings of the 36th Workshop of the INFN Eloisatron Project, Nov. 1997, pp. 131–140.

Ferenc, "A "LEGO" Hybrid Photon Detector—assembled from standard mass-produced vacuum components", Nuclear Instruments and Methods in Physics Research A 442 (2000) 124–127.

Mirzoyan et al., "An evaluation of the new compact hybrid photodiodes R7110U–07/40 from Hamamatsu in high-speed light detection mode", Nuclear Instruments and Methods in Physics Research A 442 (2000) 140–145.

Ferenc, Daniel; "SIMPLE—A Novel Concept of an Imaging Camera for Space Applications;" Nuclear Instruments and Methods in Physics Research, Section A, vol. 504, pp. 116–119, (2003).

Ferenc, Daniel et al.; "First Reference Photosensor Prototype," Nuclear Instruments and Methods in Physics Research, Section A, vol. 504, pp. 359–363, (2003).

Smith, Bill et al.; "Development of Hybrid Photodetectors Using Single-Crystal III–V Photocathodes," Nuclear Instruments and Methods in Physics Research, Section A, vol. 504, pp. 182–187, (2003).

Daniel Ferenc et al.; "Novel Low-Mass Camera for Highly Efficient Detection of Ultrahigh Energy Cosmic Rays," unpublished grant proposal, pp. 1 thru 26, (2003).

* cited by examiner

FIG. 7

HIGHLY SENSITIVE IMAGING CAMERA FOR SPACE APPLICATIONS INCLUDING DETECTION OF ULTRAHIGH ENERGY COSMIC RAYS

CROSS-REFERENCE TO RELATED APPLICATIONS

This application claims priority from U.S. provisional application Ser. No. 60/386,984 filed on Jun. 6, 2002, incorporated herein by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to imaging devices, and more particularly to imaging cameras for detecting ultrahigh energy cosmic rays in space.

2. Description of Related Art

One of the most challenging issues in Astroparticle Physics has been the observation of Extreme Energy Cosmic Rays (EECRs). The existence of particles with energy above $\sim 5 \times 10^{19}$ eV raises fundamental questions about their origin and propagation in space. EECRs have been detected through the Extensive Air Showers (EAS) produced in the Earth Atmosphere. The shower development is accompanied by the emission of fluorescence light in the atmosphere, and in particular, fluorescence light induced in nitrogen with characteristic spectral lines in the ultraviolet (UV) waveband between approximately 300 nm and approximately 400 nm.

Current knowledge of the EECR phenomenon is based on the data of very limited statistics. Planned efforts for the future study of EECRs include ground-based experiments, and experiments in space. Space borne experiments, and in particular the OSS mission Wide-angle Orbiting Lens (OWL), should observe the fluorescence signal in the atmosphere, looking downward from Space at the dark Earth's atmosphere, under ~60 degree field of view. The fine segmentation and the time resolution of a large camera can allow the reconstruction of the shower arrival direction and energy.

The Extreme Universe Space Observatory (EUSO) is a currently considered space mission that is devoted to the investigation of cosmic rays and downward from Space at the dark Earth's atmosphere, under a 60 degree full filed of view. The fine segmentation and the time resolution of a large camera can allow the reconstruction of the shower arrival direction and energy. EUSO is expected to detect of the order of $10^3$ EECRs of energy $E > 10^{20}$ eV per year, and to open a window into the High Energy neutrino Universe. Current ideas for the design of the camera are essentially based on classical photomultiplier tubes, or hybrid photon detectors. Apart from being heavy and complicated for space applications, such cameras can have other problems, like low quantum efficiency, in particular in the important ultraviolet region, very large dead area around sensitive pixels, non-uniform response, and high cost.

A small number of cosmic rays of extreme energies have been discovered in ground-based experiments. The origin of these cosmic rays presents a complete mystery, since they should not be able to arrive from large distances (due to the interaction with the low-energy photon background), and on the other hand there is no candidate for the "accelerator" of such particles nearby, or in fact, anywhere. A possible solution of this mystery can have a very strong impact on cosmology. The large ground-based experiment "Auger" is dedicated to study this phenomenon. However, much higher event statistics can be achieved by measurements from space. In order to provide for imaging in space, however, a very large (e.g., 3 m in diameter) and very low weight imaging camera is needed.

Current camera designs are based on a very large number (>10,000) of classical photomultiplier tubes (PMT) arranged in the focal surface of a large Fresnel lens system. Although in principle feasible, this concept is hampered by numerous weaknesses. Apart from the large mass and immense constructional complexity, such cameras can have an important scientific drawback, e.g., low sensitivity, and consequently relatively high detection threshold energy, and poor energy resolution. Other drawbacks include very low quantum efficiency (in particular in the important ultraviolet region), very large dead area around the sensitive pixels, and very high cost. It happens that PMTs present the main source of these problems.

Figure 1:
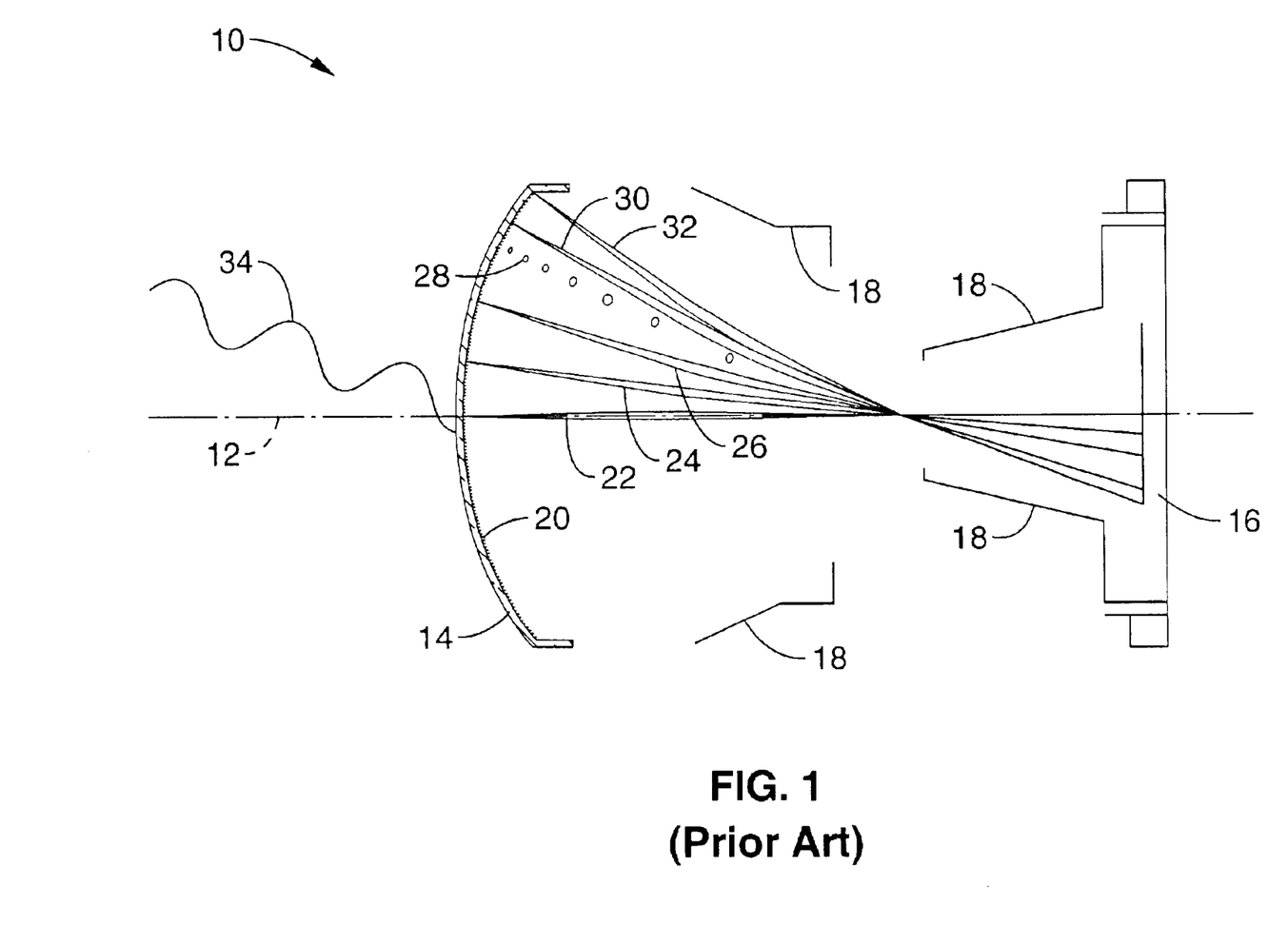
FIG. 1 is a schematic diagram of an electron lens using a transmission mode photocathode.

For example, FIG. 1 is a schematic diagram of an imaging electron lens, generally designated 10, that uses a transmission-mode photocathode according to a design which is described in D. Ferenc, *Imaging Hybrid Photon Detectors with Minimized Dead Area and Protection Against Positive Ion Feedback*, Nucl. Instr. and Meth. A431 (1999) pp. 460–475, incorporated herein by reference.

As shown in FIG. 1, the electron lens 10 defines a central axis 12. A generally curved glass window 14 and an electron sensor 16 are placed along the central axis 12 at a predetermined distance from each other. FIG. 1 shows plural focusing electrodes 18 between the photocathode 14 and the electron sensor 16. Moreover, a photocathode layer 20 is disposed on the glass window. FIG. 1 further shows a first electron trajectory 22, a second electron trajectory 24, a third electron trajectory 26, a fourth electron trajectory 28, a fifth electron trajectory 30, and a sixth electron trajectory 32 within the electron lens 10. It is to be understood that these electron trajectories 22, 24, 26, 28, 30, 32 correspond to an angular spread of ±45 degrees, at an electron energy of 1 eV. It can be appreciated that light 34 can reach the photocathode 14, e.g., from the left looking at FIG. 1 and can cause the photocathode 14 to emit photoelectrons. In turn, the photoelectrons emerging from the photocathode 14 can be focused by the electron lens 18 to the electron sensor 16.

It will be appreciated that non-imaging photosensors based on a reflection-mode photocathode exist, e.g., the non-imaging reflection-mode ReFerence photosensor (see, D. Ferenc, A Novel Photosensor Concept, Nucl. Instr. and Meth. A 471 (2002) p. 229, incorporated herein by reference; D. Ferenc et al., First ReFerence photosensor prototype, Nucl. Instr. and Meth. A 504 (2003) pp. 359–363, incorporated herein by reference). However, so far no imaging phototubes based on a reflection-mode photocathode exist, with the exception of the Blind-HPD in which a blind resembling a Venetian blind is attached to the entrance window of the tube (see, D. Ferenc, *Imaging Hybrid Photon Detectors with a Reflective Photocathode*, Nucl. Instr. and Meth. A 442 (2000) pp. 150–153, incorporated herein by reference). That design offers good imaging quality, but has only very limited application due to its narrow angular acceptance and wide time jitter.

It will also be appreciated that an imaging electron lens based on a reflection-mode photocathode is problematic in general because the photoelectrons must move in the opposite direction from the incoming light, which requires the focusing electrodes and the position-sensitive electron sensor to reside upstream from the photocathode. This in turn leads to an unacceptable but apparently inevitable optical obstruction of the photocathode.

Figure 2:
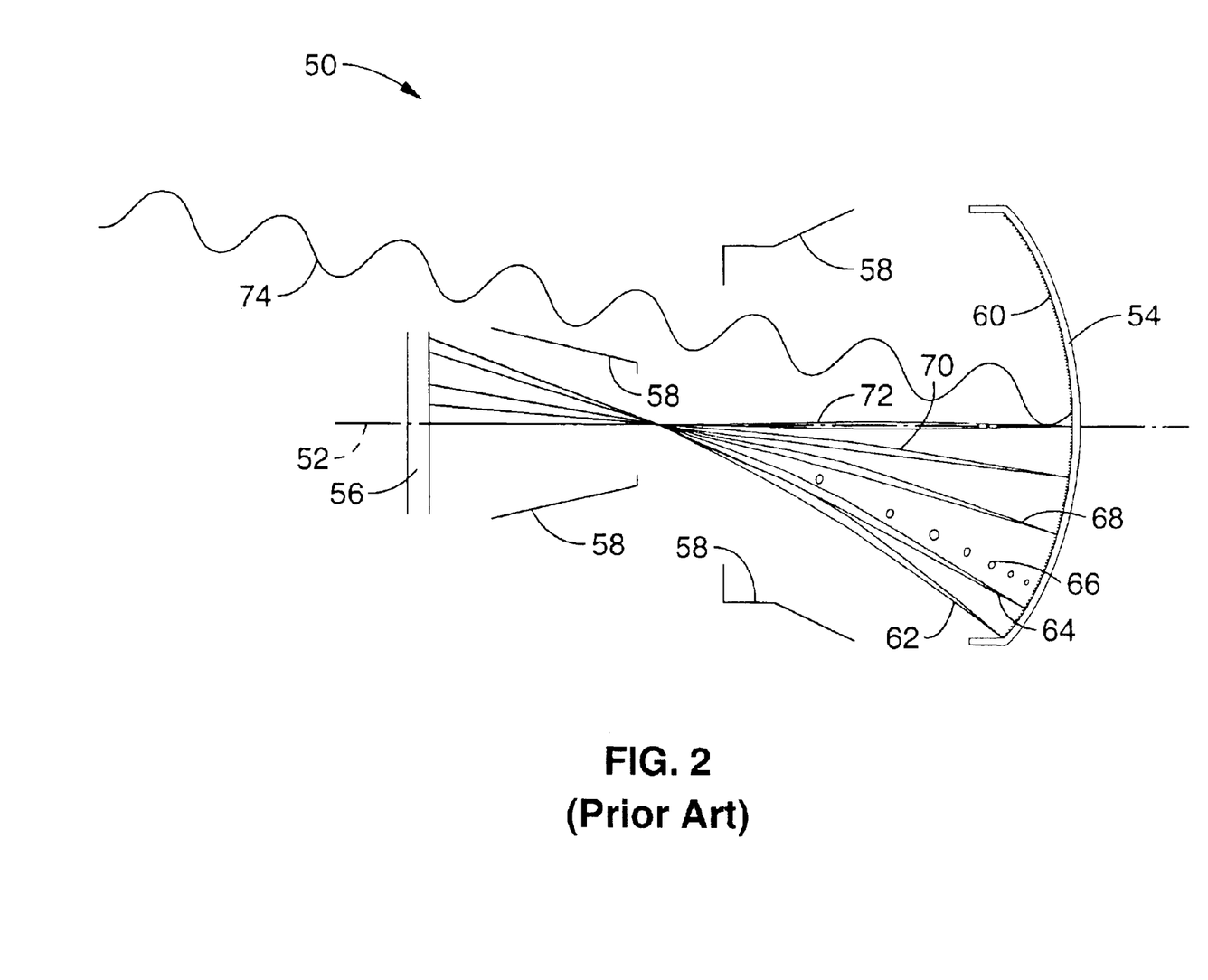
FIG. 2 is a schematic diagram of an electron lens using a reflection mode photocathode.

FIG. 2, for example, shows one such imaging electron lens, generally designated 50, that uses a reflection-mode photocathode. As shown in FIG. 2, the electron lens 50 defines a central axis 52. A non-transparent, generally curved substrate 54 and an electron sensor 56 are placed along the central axis 52 at a predetermined distance from each other. FIG. 2 shows plural focusing electrodes 58 placed between the substrate 54 and the electron sensor 56. Moreover, as shown in FIG. 2, a photocathode layer 60 is disposed on the substrate 54.

FIG. 2 further shows a first electron trajectory 62, a second electron trajectory 64, a third electron trajectory 66, a fourth electron trajectory 68, a fifth electron trajectory 70, and a sixth electron trajectory 72 within the electron lens 50. It can be appreciated that light 74 can reach the photocathode 54, e.g., from the left looking at FIG. 2 and can cause the photocathode 54 to emit photoelectrons. In turn, the photoelectrons emerging from the photocathode 54 can be focused by the electron lens 58 to the electron sensor 56. Unfortunately, it can be quickly appreciated that, in this configuration, the electron sensor 56 and the electron lens 58 block a substantial portion of the light 74 before it reaches the photocathode 54.

Therefore, there is a need for a very high sensitivity (quantum efficiency), single-photon resolution, fast response, minimum dead area, unique constructional simplicity, and extremely low weight camera. The present invention satisfies that need, as well as others.

BRIEF SUMMARY OF THE INVENTION

The present invention pertains to a photocathode camera for use in space that exhibits low weight and cost, has negligible dead area, is relatively simple to construct, and exhibits high quantum efficiency.

An aspect of the invention is to avoid the heavy structural vacuum-sealing elements typically involved in camera construction, as well as partial usage of vacuum in space. By way of example, and not of limitation, the camera is constructed in an inert gas atmosphere on the Earth at atmospheric pressure. The inert atmosphere can protect the photocathode surface from harmful gases. In some cases, in addition, a special protective layer may be applied over the photocathode, such as a thin layer of Arsenic. Once the camera reaches its operational orbit, the camera is vented and exposed to ultra high vacuum in space, then isolated from the space environment, and internally vacuum pumped with the excessive use of getter surfaces. The camera will be ready for use, and in some cases certain remaining processes in photocathode preparation may still be performed in space.

The operation principle of the camera is based on the photoelectric effect in vacuum, without the need for a vacuum-sealed vessel. In one embodiment, a camera comprises a precise imaging electron lens (<5 mm resolution) based on a large reflection-mode photocathode and means for preserving the photocathode during construction at atmospheric pressure.

An aspect of the invention is use of a photosensor based on the photoelectric effect in vacuum, without a vacuum-sealed vessel.

Another aspect of the invention is the fabrication of a large, monolithic vacuum-based electron lens, based on the vacuum in space.

Still another aspect of the invention is to provide imaging electron optics with a uniform reflection-mode photocathode.

A still further aspect of the invention is to provide a Fresnel optical lens modified to perform simultaneously as an electron lens, without adverse effect on optical properties.

An object of the invention is to provide a detector which would become of key importance for any future space-borne EECR mission. Another object of the invention is to avoid deficiencies found in PMT cameras such as use of a transmission-mode photocathode, use of massive and bulky vacuum enclosures, use of expensive dynode multipliers, large dead area, and the extremely large number of PMTs needed to cover the focal plane, accompanied with readout electronics distributed all over that plane behind the PMTs. A further object of the invention is to provide a camera that uses a reflection-mode photocathode, does not require any vacuum chambers, does not require a dynode multiplier, does not have a dead area, uses only one super-large phototube, and uses a single, small, multi-pixel photoelectron sensor that can be integrated with a digital readout.

Further aspects and objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Figure 3:
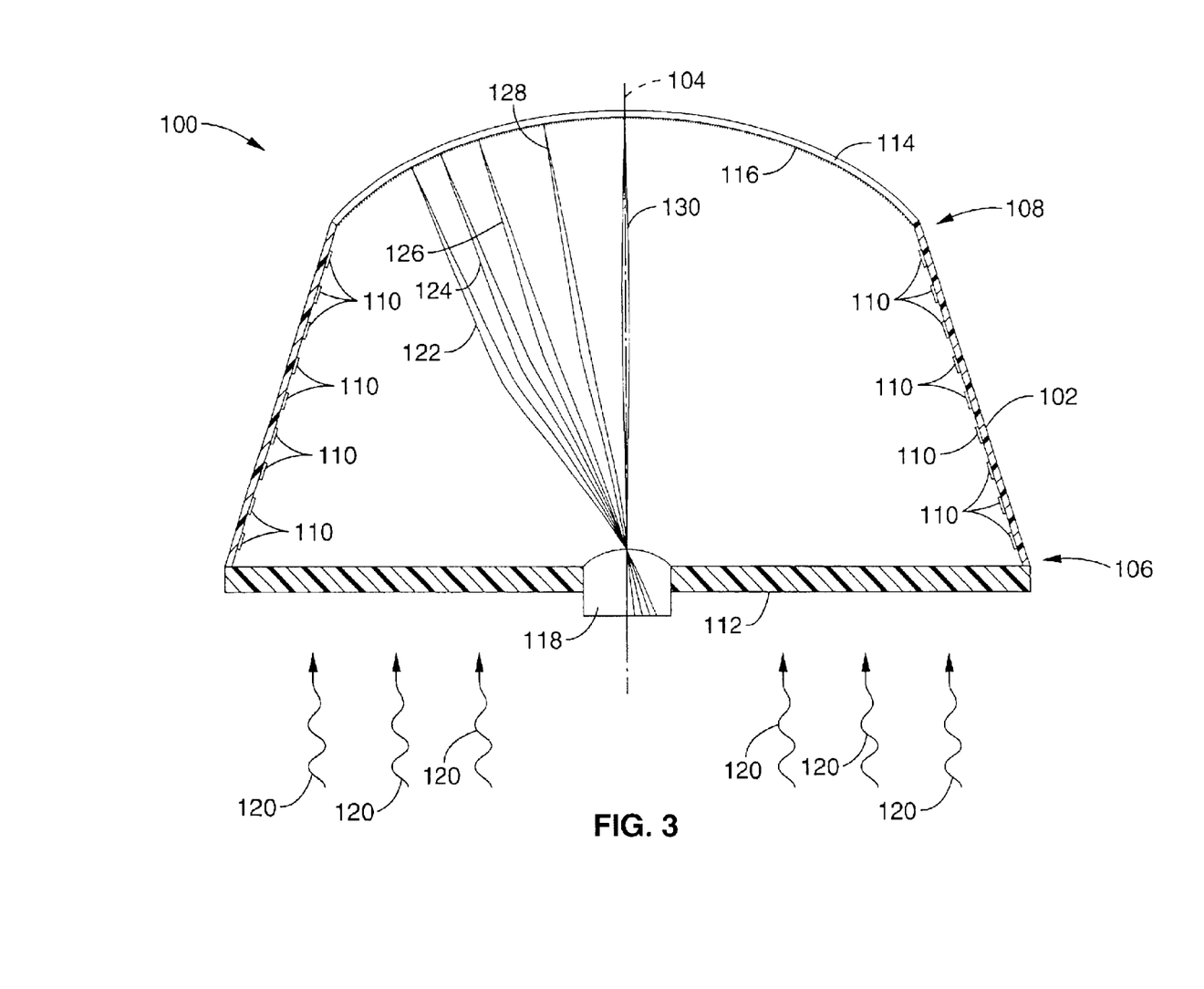
FIG. 3 is a schematic diagram of an imaging camera of according to the present invention.
Figure 4:
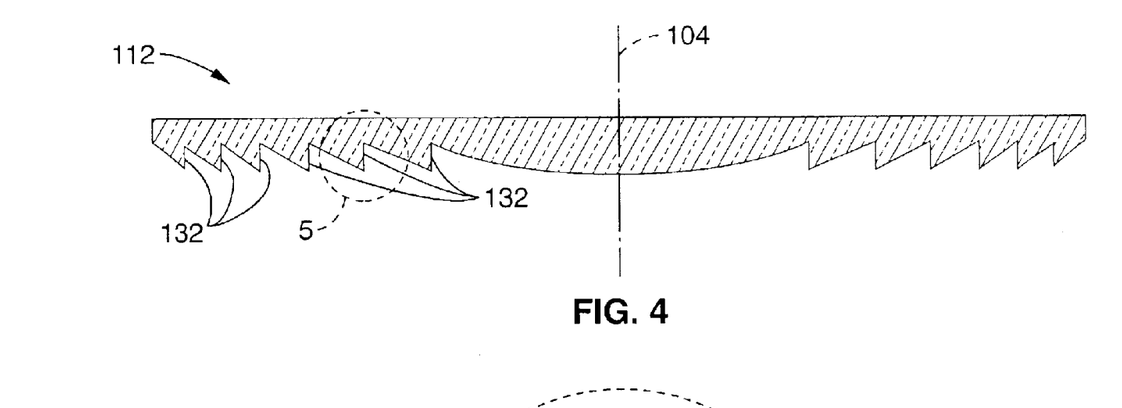
FIG. 4 is a plan view of a Fresnel lens.
Figure 5:
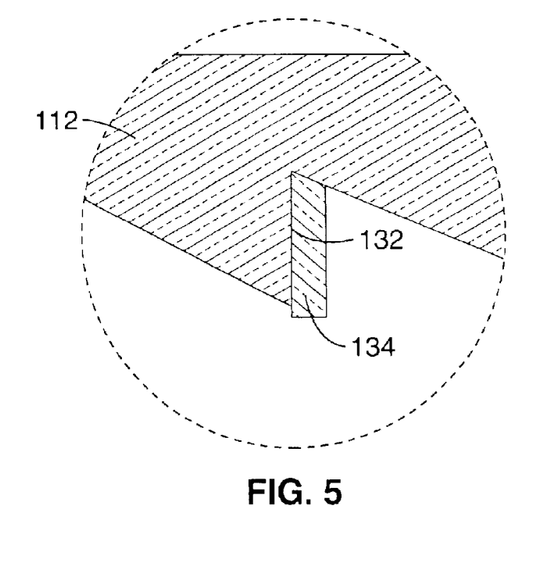
FIG. 5 is a detailed view of the Fresnel lens taken at circle 5 in FIG. 4.

Referring more specifically to the drawings, for illustrative purposes the present invention is embodied in the apparatus generally shown in FIG. 3 through FIG. 5. It will be appreciated that the apparatus may vary as to configuration and as to details of the parts, and that the method may vary as to the specific steps and sequence, without departing from the basic concepts as disclosed herein.

Referring first to FIG. 3, an embodiment of an imaging camera according to the present invention is shown and is generally designated 100. As will be seen, the present invention comprises an imaging electron lens that works with a reflection-mode photocathode. Its purpose is to focus photoelectrons emerging from a photocathode surface to a multi-pixel electron sensor.

In the embodiment shown, the imaging camera 100 includes a generally frusto-conical housing 102 that defines a central axis 104. The housing 102 further defines a proximal end 106 and a distal end 108. In a preferred embodiment, the interior of the housing 102 is covered by at least one conductive layer and preferably multiple conductive layers 102 (e.g., rings) having different potentials which provide desired focusing.

Preferably, the imaging camera 100 includes a Fresnel lens 112 that is installed at the proximal end 106 of the housing 102. Moreover, a generally curved, non-transparent substrate 114, such as a curved metallic substrate, is installed at the distal end 108 of the housing 102 opposite the Fresnel lens 112. FIG. 3 shows a photocathode layer 116 that is established on the substrate 114. In one embodiment, the photocathode layer 116 is a type III–V negative affinity (NEA) photocathode. In another embodiment, the photocathode 116 is a multi-alkali photocathode. In general, any suitable photocathode material would be applicable. As further shown in FIG. 3, a small multi-pixel electron sensor 118 can be placed in the center of the Fresnel lens 112. It is to be understood that by placing the electron sensor 118 in the middle of the Fresnel lens 112 the optical obstruction of the imaging camera 100 is minimized.

FIG. 3 further shows light 120 impinging on the Fresnel lens 112. Moreover, a first electron trajectory 122, a second electron trajectory 124, a third electron trajectory 126, a fourth electron trajectory 128, and a fifth electron trajectory 130 are shown and represent an angular spread of ±45 degrees at 1 eV.

In a preferred embodiment, the imaging camera 100 can be constructed at atmospheric pressure, in a clean inert gas atmosphere, with special means of protection of the photocathode 116 from traces of harmful gases. Thereafter, the imaging camera 100 can be evacuated during the launch, and operated in an internally managed ultra high vacuum in space. Moreover, instead of a large focal surface, covered with more than 10,000 multi-anode PMTs, backed by the electronics and supported by a strong and massive reinforced structure, the focal plane of the imaging camera 100 according to the present invention can include only a thin photocathode 116 deposited on a light substrate that can be flexible and/or foldable. As a result, the imaging camera 100 can have a relatively low mass due to the lack of any generally high mass pressure-supporting structural elements.

Further, the electronics can be integrated within the small multi-pixel photoelectron sensor 118 that is placed in the focal point of the imaging camera 100, e.g., in the center of the Fresnel lens 112. Preferably, the area of the photoelectron sensor 118 can be on the order of several percent of the total area of the photocathode 116.

Referring to FIG. 4 and FIG. 5, details regarding the Fresnel lens 112 can be seen. As shown, the Fresnel lens 112 includes plural "optically passive" surfaces 132 that are parallel to the central axis 104. Each of these surfaces 132 is covered by a conductive layer 134 in order to establish plural electrodes.

Preferably, the electrodes are entirely embedded within the Fresnel lens 112 and accordingly, optical obstruction is minimized. It happens that the conductive layers 134 disposed over the optically passive surfaces 132 of the Fresnel lens 112 can also be useful for improving the optical performance of the Fresnel lens 112 by absorbing harmful stray light. Moreover, the multitude and continuity of the concentric electrodes established over the entire Fresnel lens 112 provide the means to create a complex electric field in the camera. It is to be understood that the conductive layer 110 on the interior of the housing 102 and the conductive layers 134 on the Fresnel lens 112 together establish an electron lens within the imaging camera 100.

During operation, fluorescence light 120 from an air shower in the atmosphere can enter the imaging camera 100 through the Fresnel lens 112 and can form an image on the surface of the reflection-mode photocathode layer 116. Photoelectrons are accelerated and focused to the small multi-pixel electron sensor 118 in the center of the Fresnel lens 112.

It will be appreciated that the Fresnel lens 112, which is needed to focus the optical image onto the photocathode layer 116, can simultaneously act as a sophisticated electrode for the creation of an appropriate potential distribution in the electron lens established by the conductive layer 110 on the interior of the housing 102 and the conductive layers 134 on the optically passive surfaces 132 of the Fresnel lens 112. The appropriate potentials can be applied to and distributed over the conductive layers 132 of the Fresnel lens 112 to energize the conductive layers. Accordingly, the Fresnel lens can be at least partially energized by application of one or more electric potentials to the conductive layers. Moreover, the electric potential may be varied between different optically passive surfaces 132, over the entire diameter of the Fresnel lens 112, without deterioration of the optical performance of the Fresnel lens 112. The multitude and the continuity of the electrodes established over the entire diameter of the Fresnel lens 112 assure the possibility to create a very complex, stable, and precise electric field in the camera. It is to be understood that the optically passive surfaces 132 of the Fresnel lens 112 do not participate in the optical focusing of the Fresnel lens 112. Accordingly, if the optically passive surfaces 132 are made electrically conductive and optically opaque, as described above, the throughput of light through the Fresnel lens 112 is not decreased.

It can be appreciated that the invention can be practiced following a variety of different standard production schemes and practices used in the production of different high vacuum tubes. When vacuum-sealed, this type of imaging camera, can also be useful in many ground-based applications, such as physics, medical and other imaging applications.

Figure 6:
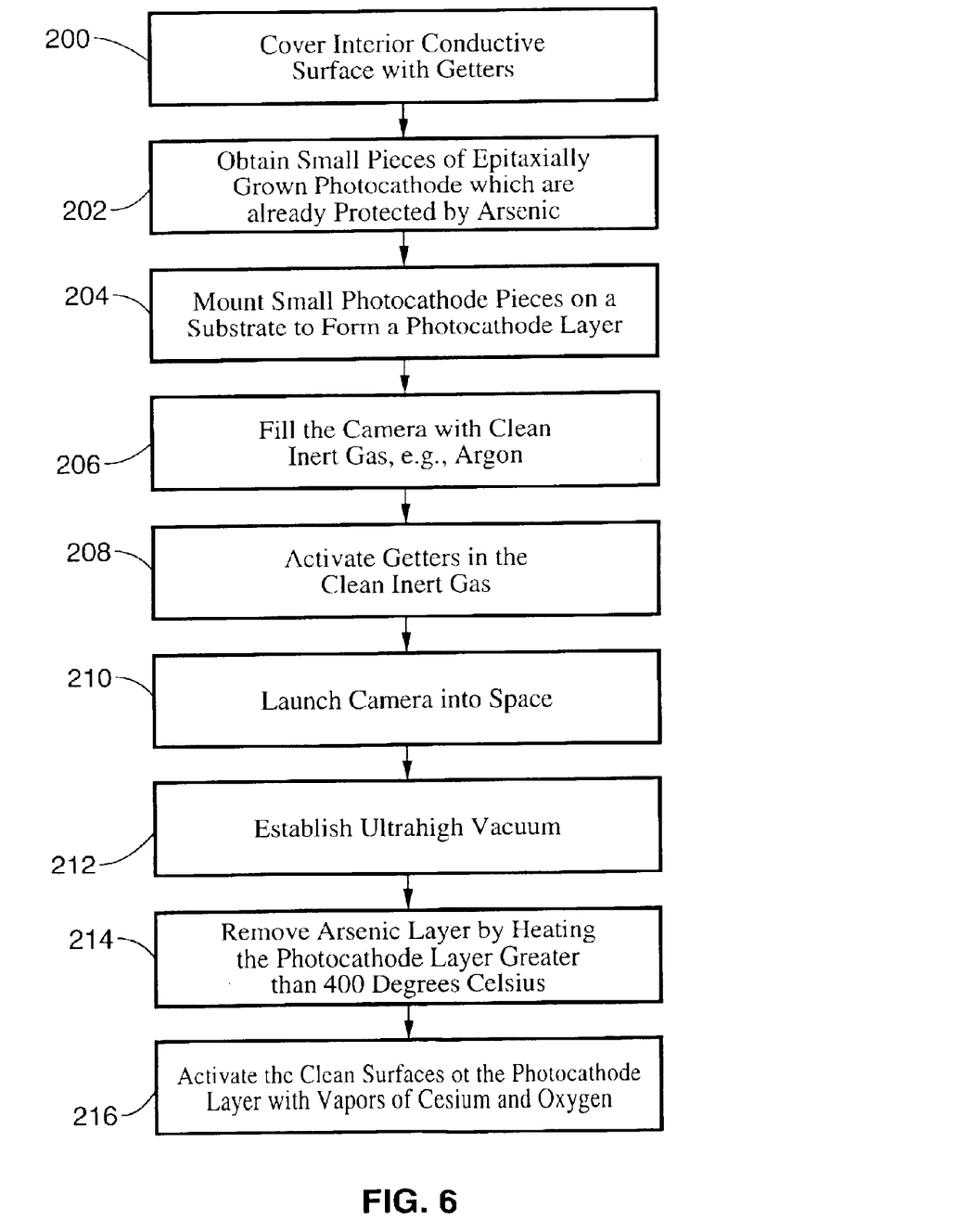
FIG. 6 is a flow chart of a method for making an imaging camera according to the present invention.
Figure 7:
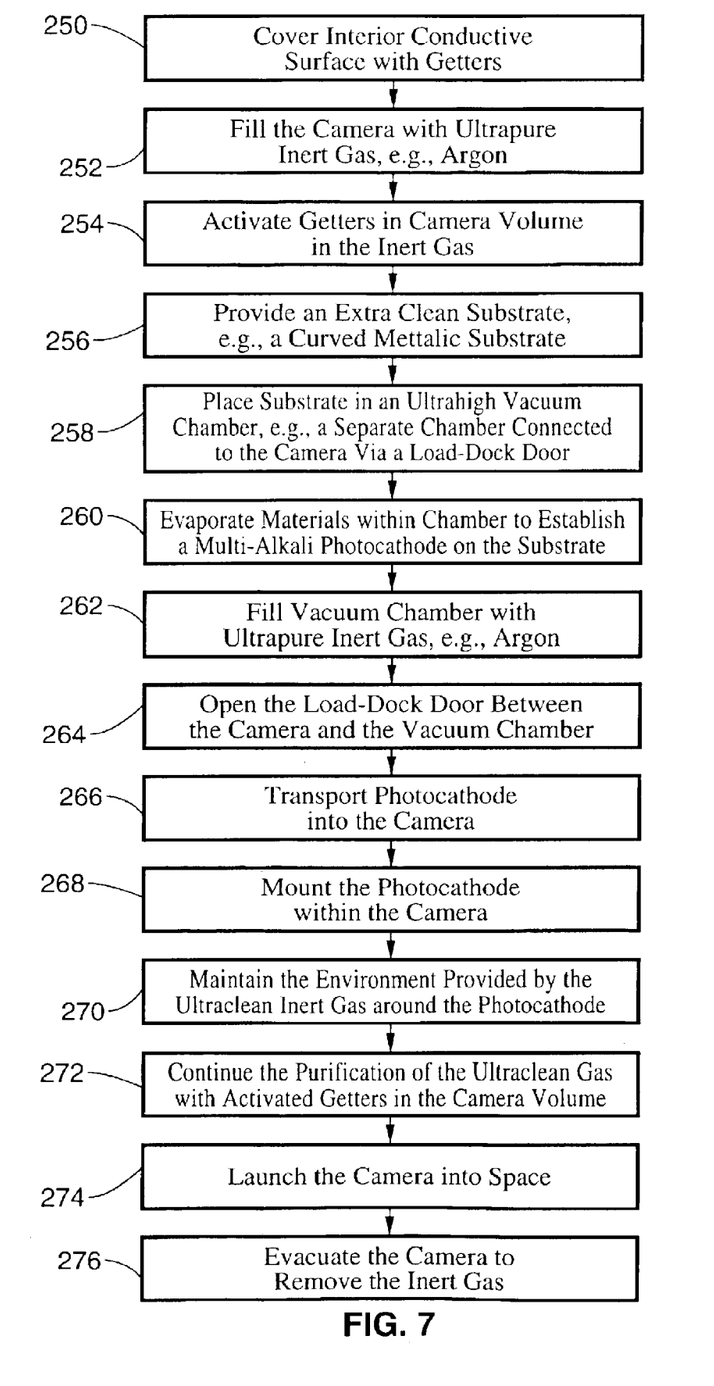
FIG. 7 is a flow chart of an alternative method for making an imaging camera according to the present invention.

Two methods for making the imaging camera 100 are shown in FIG. 6 and FIG. 7 and are described in detail below.

Referring first to FIG. 6, an embodiment of a method for making a camera according to the present invention is shown and commences at step 200 wherein at least a portion, and preferably the largest possible area, of the interior conductive surfaces 110, 134 within the camera 100 are coated by a layer of getters, e.g., evaporative getters or non-evaporative getters (NEG). NEG film, for example, developed at CERN for covering vacuum surfaces in accelerators, is particularly suitable for efficient and lightweight vacuum management, e.g., in the present invention, because it activates at a low temperature, and may be reactivated many times. Moreover, it can be applied to relatively large areas. Note that reactive gasses, and not Argon, that come in contact with the getter film will essentially be absorbed by the getter film. As a consequence, inert gas within the camera 100 can be cleaned (e.g., before launch) and the vacuum will be cleaned (e.g., after launch and in space). Accordingly, the camera internal environment is kept clean during fabrication and operation.

Returning to the method shown in FIG. 6, at step 202 small pieces of epitaxially grown photocathode that are protected by Arsenic are obtained. This Arsenic-cap protection technique is based on the deposition of a protective layer (~20 nm thickness) on top of the photocathode surface. The deposition is performed in the same production facility in which the photocathode structure was epitaxially grown, at the end of that process. This layer provides excellent protection, in particular against an inert gas atmosphere. The Arsenic-cap technique is well known, and has been routinely applied to protect reflection-mode III–V NEA photocathodes (e.g., in electron source facilities at accelerators). It is important to note that the Arsenic-cap protection, performed immediately after the epitaxial growth of the photocathode structure, and in the same production facility, is possible only with reflection-mode photocathodes.

Moving to step 204, the small photocathode pieces are mounted on a substrate, e.g., the substrate 114 shown in FIG. 3, to form a photocathode layer, e.g., the photocathode layer 116 shown in FIG. 3. Next, at step 206, the camera is filled with clean inert gas, e.g., Argon. Thereafter, at step 208, the NEG film is activated in the clean inert gas. Proceeding to step 210, the camera can be launched into space. At step 212, an ultrahigh vacuum can be established, i.e., in space.

Continuing to step 214, the Arsenic layer is removed by heating the photocathode layer to a temperature greater than 400 degrees Celsius, just like in the standard cleaning process performed in laboratories. Since the camera will have a very large photocathode area, it is likely that the limited electrical power available on a satellite can be used to clean only small photocathode sections at a time. This can be facilitated by the large III–V NEA photocathode 116 comprising small individual elements. In this sequential cleaning process, care should be taken to avoid Arsenic deposition on already cleaned (cold) surfaces.

Finally, at step 216, the clean surfaces of the photocathode 116 are activated with vapors of Cesium and Oxygen. Accordingly, alternate layers of Cesium and Oxygen are deposited on the clean surface of the photocathode 116. The quality of the vacuum environment plays central role in this process, and in space it should be at least as good as in production facilities. It happens that the photocathode 116 can be reactivated at any later time if the performance of the photocathode 116 deteriorates for any reason.

FIG. 7 shows an alternative method for making a photocathode, e.g., the photocathode 116 shown in FIG. 3. Commencing at step 250, at least a portion, and preferably the largest possible area, of the interior conductive surfaces are coated with getters, e.g., evaporative getters or non-evaporative getters (NEG). At step 252, the camera is filled with ultrapure inert gas, e.g., Argon. Moving to step 254, the getters within the camera are activated in the inert gas. Next, an extra clean substrate, e.g., a curved metallic substrate, is provided at step 256.

Proceeding to step 258, the substrate is placed in an ultrahigh vacuum chamber, e.g., a separate chamber connected to the camera via a load-lock door. Thereafter, at step 260, materials are evaporated within the vacuum chamber to establish a multi-alkali photocathode on the substrate. In one embodiment, these materials can include Antimony plus Cesium, Potassium, Sodium, Oxygen, Manganese, or Lithium. Returning to the method, at step 262 the vacuum chamber is filled with ultrapure inert gas, e.g., Argon. At step 264, the load-lock door between the camera and the vacuum chamber is opened. Continuing to step 266, the photocathode is transported to the camera. Then, at step 268 the photocathode is mounted within the camera.

Moving to step 270, the environment provided by the ultraclean inert gas is maintained around the photocathode. Moreover, at step 272, the purification of the ultraclean gas with the activated getters within the camera volume is continued. At step 274, the camera can be launched into space. Finally, at step 276, the camera can be evacuated to remove the inert gas.

With the configuration of structure described above, the imaging camera 100 of the present invention can include a uniform and continuous reflection-mode photocathode 116 of a very large area, e.g., several $m^2$. The reflection-mode photocathode 116 can be directly exposed to the images of the air-showers focused by the Fresnel lens 112, without any intermediate optical interfaces or windows. This can significantly reduce optical losses compared to prior design concepts. In a preferred embodiment, the reflection-mode photocathode 116 can have a high intrinsic quantum efficiency, particularly in the important wavelength domain of approximately 320 nm to 400 nm. The configuration of structure of the above-described imaging camera 100 also results in significant reductions in the production complexity, weight, and cost of the imaging camera 100.

In an alternative embodiment, not shown, it can be possible is to eliminate central electron focusing, and instead apply a distributed, many-pixel focal plane, with open (vacuum-unsealed) ReFerence tube units in a hexagonal honeycomb structure. The ReFerence units can collect the photons to the appropriate photocathodes, and the photoelectrons can be focused to the small electron sensors, placed in the middle of the entrance aperture of the corresponding ReFerence units. The entrance of the ReFerence units can be uncovered, i.e. open to the Cesium and Oxygen evaporation during the photocathode activation process. All the photocathodes in such a composite focal plane can be activated simultaneously. An imaging camera of this design can be very light, but it will provide a limited spatial resolution due to the finite pixel size. This design can also provide an excellent protection against stray magnetic fields, since the electron path would be very short and a rapid acceleration would take place. Further, each individual ReFerence pixel could be very efficiently magnetically shielded.

One of the problems with very large electron tubes in general has been deflection of electron trajectories in a stray magnetic field. Although the geomagnetic field in space is relatively weak, it can have a strong effect in a large electron lens, since the electron trajectories are long. Two different methods are possible to reduce the effect of magnetic field: to screen the field, or to make the electron lens less sensitive to the field. The magnetic field could be screened by surrounding the camera with a $\mu$-metal enclosure. However, that enclosure can exert a complicated magnetic force on the entire satellite. Actively canceling stray fields by magnetic coils can also exert forces on the satellite. However, the AMS experiment, also on board the International Space Station, uses a very strong superconducting magnet, which is apparently a manageable problem. Therefore, with our very low magnetic force, we should not expect major problems. In general, electron lenses are less sensitive to the magnetic fields when the electrons spend very short time moving at low velocities (magnetic deflection is inversely proportional to the velocity). This means that the electrons need very fast acceleration, already close to the photocathode. That can be achieved, for example, with a grid at a relatively high potential, placed very close to the photocathode.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An imaging camera, comprising:
   a Fresnel lens having a center;
   a photocathode distanced from the Fresnel lens;
   a housing between the Fresnel lens and the photocathode; and
   an electron sensor disposed in the center of the Fresnel lens.

2. An imaging camera as recited in claim 1, wherein the housing includes an interior surface and the camera further comprises:
   at least one conductive layer on the interior surface of the housing.

3. An imaging camera as recited in claim 2, wherein the imaging camera has a central axis and the imaging camera further comprises:
   at least one optically passive surface established by the Fresnel lens parallel to the central axis; and
   at least one conductive layer on the optically passive surface.

4. An imaging camera as recited in claim 3, further comprising:
   an electron lens established by the conductive layer on the interior of the housing and the conductive layer on the Fresnel lens.

5. An imaging camera as recited in claim 1, wherein the photocathode comprises a reflection mode photocathode.

6. An imaging camera as recited in claim 5, wherein the reflection mode photocathode comprises a III–V NEA photocathode.

7. An imaging camera as recited in claim 5, wherein the reflection mode photocathode comprises a multi-alkali photocathode.

8. An imaging camera as recited in claim 1, wherein the electron sensor comprises a multi-pixel electron sensor.

9. An imaging camera as recited in claim 1, wherein the imaging camera is at least partially assembled at atmospheric pressure on earth.

10. An imaging camera as recited in claim 9, wherein assembly of the imaging camera is completed in space.

11. An imaging camera, comprising:
    a housing having a proximal end and a distal end;
    a Fresnel lens installed in the proximal end of the housing;
    said Fresnel lens having a center;
    a photocathode installed in the distal end of the housing;
    an electron sensor disposed in the center of the Fresnel lens; and
    an electron lens at least partially established by the housing and the Fresnel lens.

12. An imaging camera as recited in claim 11, wherein the housing includes an interior surface and the camera further comprises:
    at least one conductive layer on the interior surface of the housing.

13. An imaging camera as recited in claim 12, wherein the imaging camera has a central axis and the imaging camera further comprises:
    at least one optically passive surface established by the Fresnel lens parallel to the central axis; and
    at least one conductive layer on the optically passive surface.

14. An imaging camera as recited in claim 13, wherein the electron lens is established by the conductive layer on the interior of the housing and the conductive layer on the Fresnel lens.

15. An imaging camera as recited in claim 11, wherein the photocathode comprises a reflection mode photocathode.

16. An imaging camera as recited in claim 15, wherein the reflection mode photocathode comprises a III–V NEA photocathode.

17. An imaging camera as recited in claim 15, wherein the reflection mode photocathode comprises a multi-alkali photocathode.

18. An imaging camera as recited in claim 11, wherein the electron sensor comprises a multi-pixel electron sensor.

19. An imaging camera as recited in claim 11, wherein the imaging camera is at least partially assembled at atmospheric pressure on earth.

20. An imaging camera as recited in claim 19, wherein assembly of the imaging camera is completed in space.

* * * * *